United States Patent [19]

Burford

[11] 3,853,113

[45] Dec. 10, 1974

[54] HEIGHT-ADJUSTABLE GRILLER

[75] Inventor: Bruce Alfred Burford, Fulham, Australia

[73] Assignee: Simpson Pope Limited, Dudley Park, Australia

[22] Filed: June 28, 1973

[21] Appl. No.: 374,755

[30] Foreign Application Priority Data
July 4, 1972 Australia............................ 9560/72

[52] U.S. Cl.............................................. 126/41 E
[51] Int. Cl. ........................................... A47j 37/04
[58] Field of Search .............. 126/41 E, 337 A, 340; 99/393, 391; 312/351, 236

[56] References Cited
UNITED STATES PATENTS
2,047,979   7/1936   Mills................................ 126/41 E
2,133,582   10/1938   Smallen............................ 126/41 E Primary Examiner—William F. O'Dea
Assistant Examiner—Harold Joyce
Attorney, Agent, or Firm—Hauke, Gifford, Patalidis, & Dumont

[57] ABSTRACT

A food griller of the type which can be moved into or from a cooking compartment in the manner of a drawer, and which comprises a front facia panel able to support a food carrier; includes, within the facia panel, camming, cam-follower and motion restraining mechanism enabling the food carrier to be selectively raised or lowered by operation of a horizontally movable knob on the outside of the facia panel.

4 Claims, 7 Drawing Figures

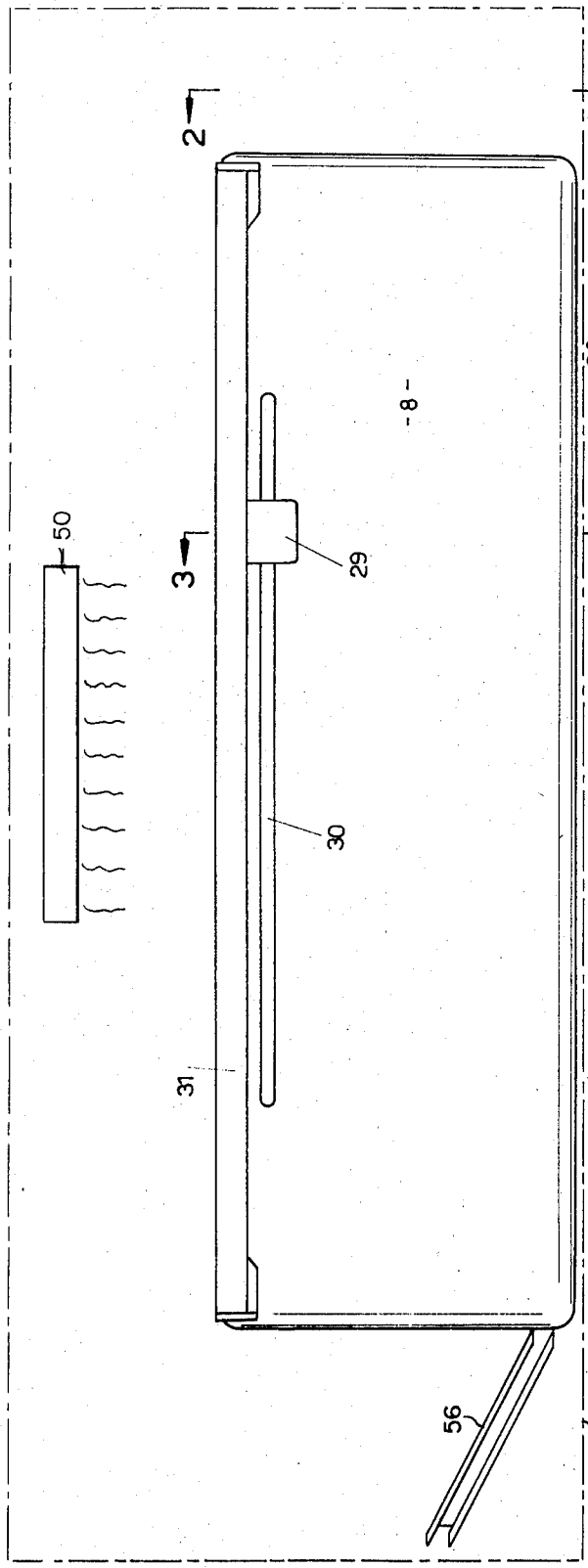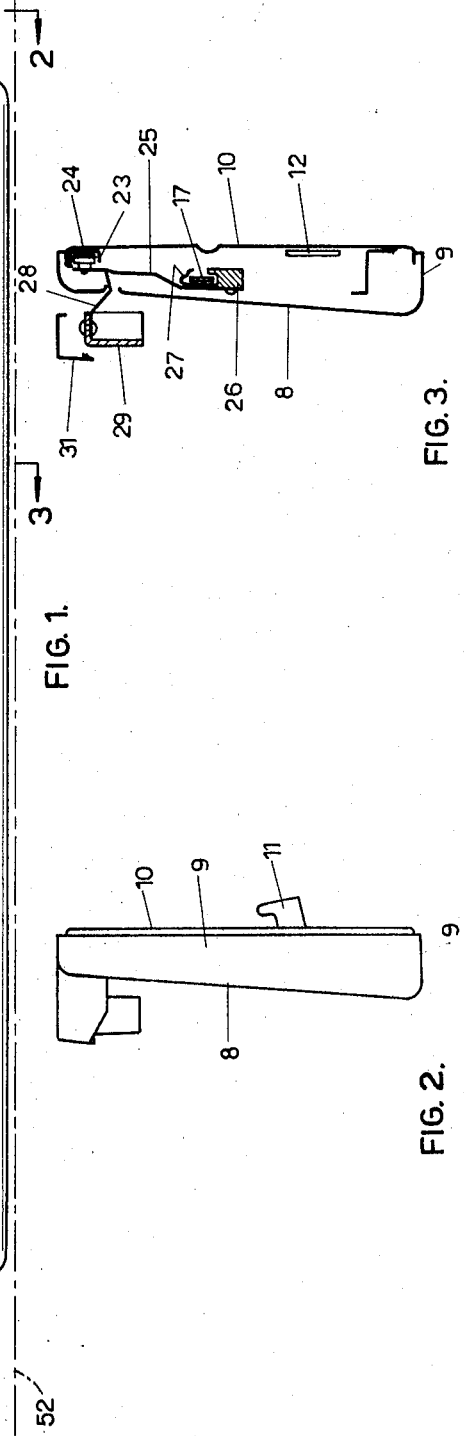

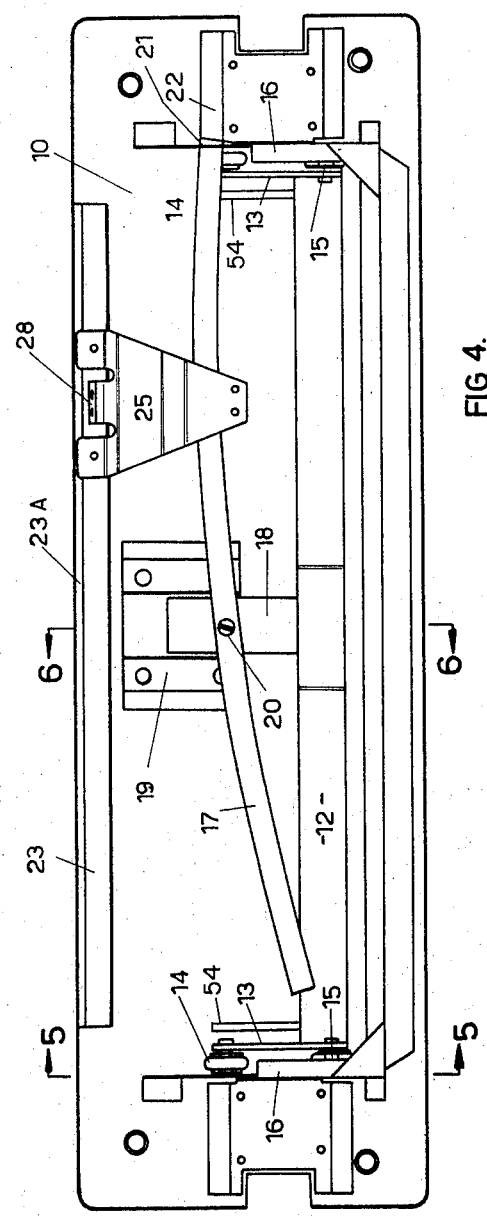
FIG. 4.
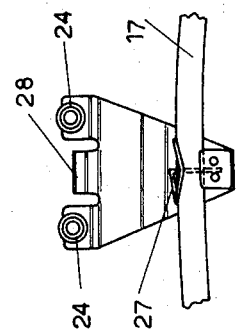
FIG. 7.
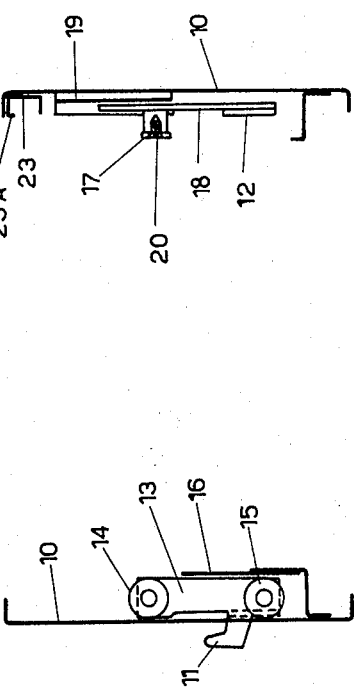
FIG. 6.
FIG. 5.

HEIGHT-ADJUSTABLE GRILLER

This invention relates to food grillers of the kind in which the food is supported within an oven grilling compartment by way of a drawer-like assembly movable into and withdrawable from the grilling compartment.

The grilling compartment is usually located under a main baking oven, or under a hot-plate or the like; at the top of the compartment a heater is provided. It may be an electrical element or it may be a radiator in the form of a number of flame heated frets.

The drawer-like assembly comprises a front facia panel the outside face of which carries a hand-piece, drawer-pull or the like; the facia panel is mounted on two support arms which are roller shod or otherwise equipped for rolling or sliding engagement with stationary runways mounted at the sides of the grilling compartment, and the facia panel is furnished with means for the cantilever support of a food carrier. Commonly the food carrier takes the form of a griller dish, or a frame to accommodate such a dish, which in turn supports a wire grille or the like.

The object of this invention is to provide a food griller of the type described above in which the food carrier may be steplessly height adjusted in a simple way.

An example of the invention is illustrated in the drawings herewith.

FIG. 1 is a front elevation of a facia panel.

FIG. 2 is an end elevation taken in the direction indicated by line 2—2 in FIG. 1.

FIG. 3 is a section taken on line 3—3 in FIG. 1.

FIG. 4 is a rear elevation with the back plate of the facia panel removed.

FIGS. 5 and 6 are sectional end elevations respectively taken on lines 5—5 and 6—6 in FIG. 4.

FIG. 7 is a detail showing, from the opposite side, a traverser bracket already shown in FIG. 4.

In the illustrated embodiment, the facia panel is of conventional kind in consisting of a rectangular front plate 8 flanged (9) on its four sides and a back plate 10 which is fixed to the front plate by screw or other fastenings.

The facia panel is thus hollow and is thereby enabled to constitute a housing for the height adjustable food carrier (not shown).

The food carrier mounting means consist of a pair of hook ended lugs 11, which project through vertical slots (not shown) in the facia back plate, so that (in conventional manner) the flanged edge of a grilling dish or the like may be mounted on the lugs so to be supported thereby in cantilever fashion.

The lugs 11 project from a support 12 in the form of a plate which extends longitudinally (from side-to-side) of the facia panel interior. The support member is restrained against movement other than vertical movement within the facia panel by reason of its end margins being formed as upright flanges 13 each carrying freely rotatable rollers 14 and 15. It will be seen that the loading on lugs 11 will tend to depress it downwardly, thus restraint against unwanted movement of member 12 will be sufficiently provided for if rollers 14 simply run against the internal surface of plate 10 while the rollers 15 run in channel guide-ways 16 fixed to plate 10.

The support member 12 depends from a follower ramp 17 by means of a cross-head plate 18 to which member 12 is fixed, and which is vertically slidable in a channel runway 19 fixed on back plate 10. The ramp 17 is pivoted to plate 18 as indicated at 20.

One end (21) of ramp 17 is loosely inserted in a bearing sleeve 22 which thus acts as a pivot mount for end 21.

A channel track 23, having a lip flange 23A and fixed on the back-plate 10, provides a runway for rollers 24 carrying traverser bracket 25. A bearing block 26, and a clip 27, on bracket 25 constitute a camming element which slidably engages the follower ramp 17. A handpiece consisting of an arm 28 and a finger-knob 29 is secured to bracket 25. The arm 28 extends through slot 30 in front plate 8. This plate 8 also has a handrail 31 fixed to it.

When a food carrier, supported on lugs 11, is to be elevationally adjusted relative to the heating element in the grilling compartment, knob 29 is appropriately moved (to right or left) thus, by working through members 17, 18 and 12, raising or lowering the food carrier as required.

What is claimed is:

1. A food griller of the kind comprising an open-front oven compartment, heating means in said compartment, a facia panel able to close the open-front of said compartment, a food carrier mounted on the inside of said facia panel, and guideways enabling drawer-like movement of said facia panel relative to said compartment; characterised in that said facia panel is hollow and houses food carrier support means comprising:
   a. a food carrier support member in said facia panel which has food carrier mounting lugs extending through vertical slots in the rear face of said facia panel, and is restrained against movement other than vertical movement relative to said panel;
   b. a follower ramp which is pivoted by one end on and within said panel, and upon which said support member is suspended;
   c. a traverser bracket having a camming element engaging said follower ramp;
   d. means to restrain said traverser bracket against movement other than horizontal movement laterally of and within said panel; and,
   e. a handpiece on said traverser bracket which extends through a slot formed in the front face of said panel to project outside thereof.

2. A food griller according to claim 1 wherein said food carrier support member consists of a support plate including an upright cross-head plate, a channel runway which is fixed to said facia panel and within which said cross-head plate is vertically slidable, rollers mounted on the ends of said support plate, and channel guideways which are fixed to said facia panel and within which at least some of said rollers are freely rollable.

3. A food griller according to claim 1 wherein said follower ramp is an arcuate bar pivoted by one end on said facia panel, and, intermediate its ends is pivoted to a portion of said support member.

4. A food griller according to claim 1 wherein said means to restrain said traverser bracket comprises a channel track fixed on said facia panel and a pair of spaced apart rollers on said traverser bracket able to run within said track.

* * * * *

UNITED STATES PATENT OFFICE
CERTIFICATE OF CORRECTION

Patent No. 3,853,113   Dated Dec. 10, 1974

Inventor(s) Bruce Alfred Burford

It is certified that error appears in the above-identified patent and that said Letters Patent are hereby corrected as shown below:

In the abstract, line 4, delete "carrier; includes" and insert --and including--.
Col. 1, after the title, insert --Background of the Invention--;
Col. 1, between the 4th and 5th paragraph insert --Description of the Drawings--
Col. 1, line 30, after "panel " insert --with the oven compartment schematically illustrated--
Col. 1, between lines 39 and 40, insert --Description of a Preferred Embodiment--
Col. 1, line 47, after "shown)." insert --The facia panel is mounted on guideways 56 (only one shown) in the conventional manner thus enabling drawer-like movement of the facia panel relative to the grilling compartment 52 shown in schematic only).
Col. 1, line 50, delete "(not shown)" and insert --54 (FIG. 4)--.
Col. 2, line 18, after "element" insert --50--.
Col. 2, line 19, after "compartment" insert --52--.

Signed and sealed this 8th day of April 1975.

(SEAL)
Attest:

RUTH C. MASON
Attesting Officer

C. MARSHALL DANN
Commissioner of Patents
and Trademarks